United States Patent [19]

Wisegerber

[11] Patent Number: 4,522,158
[45] Date of Patent: Jun. 11, 1985

[54] SUPPLY OF HYDROCARBON FUELS

[76] Inventor: Lester R. Wisegerber, 38 Brown La., Dayton, Tex. 77535

[21] Appl. No.: 446,674

[22] Filed: Dec. 3, 1982

[51] Int. Cl.³ .............................................. F02B 43/08
[52] U.S. Cl. .................................... 123/1 A; 123/525; 123/557
[58] Field of Search ................... 123/1 A, 3, 557, 525, 123/522, 523, 575–582

[56] References Cited

U.S. PATENT DOCUMENTS

| | | | |
|---|---|---|---|
| 1,072,402 | 9/1913 | Peregrine | 123/25 A |
| 2,201,965 | 5/1940 | Cook | 48/211 |
| 2,430,852 | 11/1947 | Allen | 123/25 A |
| 2,752,758 | 4/1956 | Tann | 62/1 |
| 2,851,021 | 9/1958 | Covone | 123/65 R |
| 3,783,841 | 1/1974 | Hirshler, Jr. et al. | 123/1 A |
| 3,788,283 | 1/1974 | Perry | 123/3 |
| 3,794,000 | 2/1974 | Hodgkinson | 123/557 |
| 3,851,633 | 12/1974 | Shih | 123/581 |
| 3,931,801 | 1/1976 | Rose et al. | 123/557 |
| 4,003,344 | 1/1977 | Bradley | 123/1 A |
| 4,003,356 | 1/1977 | Naylor | 123/557 |
| 4,306,532 | 12/1981 | Camacho | 123/527 |
| 4,325,343 | 4/1982 | Turner | 123/527 |
| 4,370,970 | 2/1983 | Kunz | 123/557 |
| 4,398,523 | 8/1983 | Henson | 123/557 |

Primary Examiner—E. Rollins Cross
Attorney, Agent, or Firm—Arnold, White & Durkee

[57] ABSTRACT

A fuel supply system for the supply of a hydrocarbon fuel to an internal combustion engine. The system comprises a pressure storage vessel for storing a hydrocarbon fuel vapor under pressure, a compressor for withdrawing hydrocarbon fuel vapor from a liquid hydrocarbon fuel tank and feeding the vapor under pressure to the pressure storage vessel, a heater for maintaining the fuel vapor in a heated condition during use, and supply means leading from the pressure storage vessel for the supply of fuel vapor to an internal combustion engine during use.

30 Claims, 1 Drawing Figure

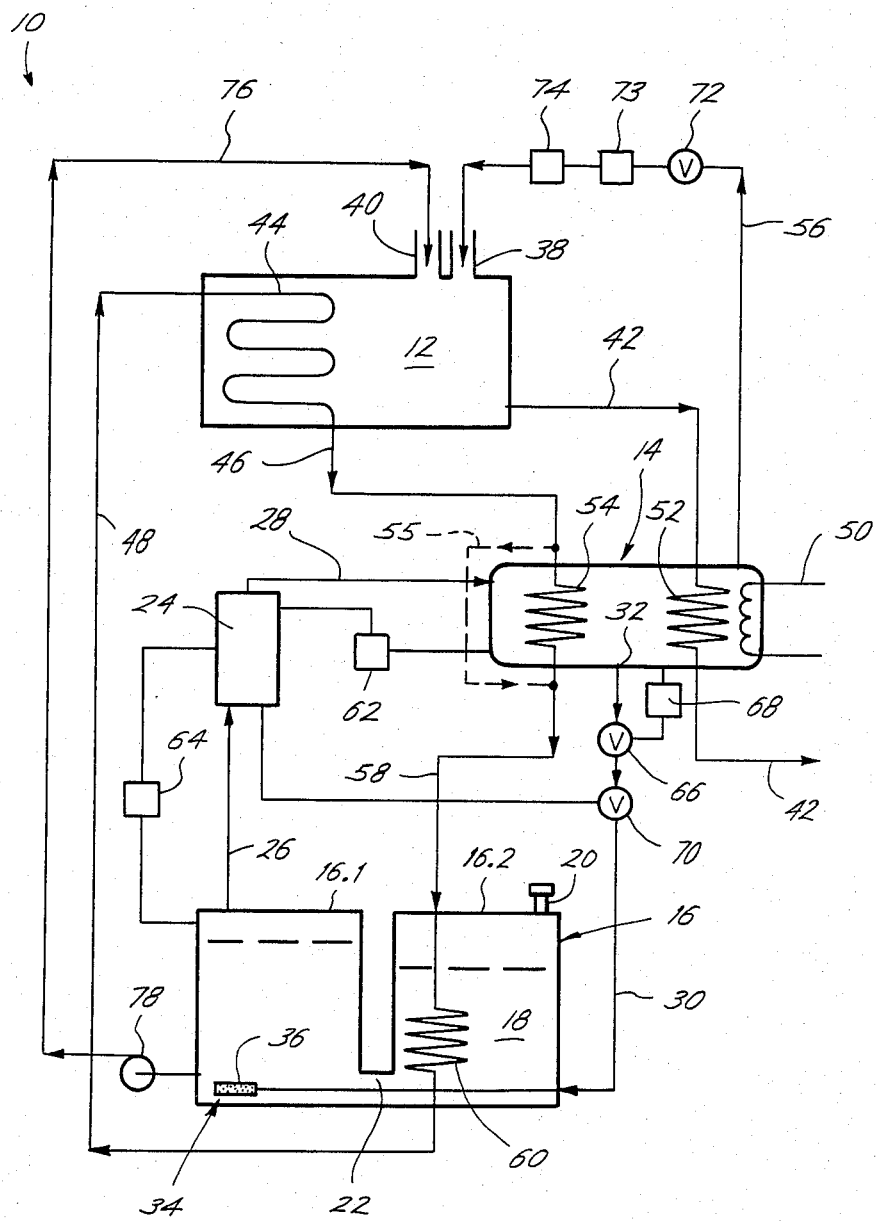

SUPPLY OF HYDROCARBON FUELS

This invention relates to the supply of hydrocarbon fuels. More particularly, this invention relates to a fuel supply system for the supply of a hydrocarbon fuel to an internal combustion engine, to a method of supplying a hydrocarbon fuel to an engine, and to an internal combustion engine incorporating such a fuel supply system.

Many attempts have been made to improve the fuel utilization of internal combustion engines, particularly those employed in powering motor vehicles. Many attempts have also been made to reduce the level of pollutants in the emission or exhaust gases of internal combustion engines. Both poor fuel utilization and a high level of pollutants in exhaust gases result from poor or incomplete combustion of fuel supplied to such engines. If fuel can be supplied to such engines in a form that substantially complete combustion can occur, the fuel utilization efficiency will improve significantly. At the same time, the level of unburned gases and other pollutants in the exhaust gases will decrease significantly.

Attempts have been made to improve fuel utilization by heating liquid hydrocarbon fuels, typically gasoline, and drawing air through such a heated body of liquid fuel. The air is drawn through the body of liquid fuel to entrain fuel vapor therein. It was believed that more complete combustion could be achieved if fuel in an already vaporized state and entrained in air was fed into the intake manifold of an internal combustion engine. These attempts were not particularly successful because of the relatively low level of fuel vapor which could be entrained in a flowing stream of air, and because such a premixed fuel/air mixture was regarded as presenting a substantial potential hazard.

Attempts have also been made in relation to internal combustion engines to improve engine performance by partially vaporizing a liquid fuel and then utilizing the vaporized volatile component for initial starting of an engine. Once the engine is running, there is an automatic switch back to the utilization of liquid hydrocarbon fuel in conventional manner.

It is an object of this invention to overcome or reduce the problems presented by the prior art systems and achieve a more effective utilization of hydrocarbon fuels in engines, particularly internal combustion engines.

In accordance with one aspect of the invention, there is provided a fuel supply system for the supply of a hydrocarbon fuel to an internal combustion engine, the system comprising:

(a) a pressure storage vessel for storing a hydrocarbon fuel vapor under pressure;
(b) compressor means for withdrawing hydrocarbon fuel vapor from a liquid hydrocarbon fuel tank and feeding the vapor under pressure to the pressure storage vessel;
(c) heating means for maintaining the fuel vapor in a heated condition during use; and
(d) supply means leading from the pressure storage vessel for the supply of fuel vapor to an internal combustion engine during use.

While the heating means may comprise heating means to heat liquid hydrocarbon fuel thereby facilitating vaporization thereof, and thereby providing a sufficient temperature for fuel vapor to remain in a heated condition, the heating means preferably comprises means for heating the pressure storage vessel during use to thereby heat the fuel vapor therein.

In one embodiment of the invention, the heating means may comprise electrical heating means to be electrically heated during use. The electrical heating means may be a heating element of the type commonly used in, for example, the intake manifold of a diesel engine.

Where the heating means is in the form of electrical heating means, it may be actuated to heat the pressure storage vessel before the engine is started. After heating for a sufficient period of time fuel vapor under pressure will be restored in the pressure storage vessel thereby allowing such an engine to be started even when cold.

Unless effective electrical heating of the pressure storage vessel is employed, it will generally be necessary to utilize conventional liquid hydrocarbon fuel for starting an internal combustion engine, and then switching to the fuel supply system of this invention once sufficient heat has been generated to heat the fuel.

In an alternative embodiment of the invention the heating means may comprise heat exchanger means which is adapted to be heated by means of exhaust gases from an exhaust system of such an internal combustion engine during use and/or adapted to be heated by means of coolant fluid employed in such an internal combustion engine for cooling such an engine during use.

In a preferred embodiment of the invention both types of heating means may be employed so that the electrical heating means can be utilized when there is insufficient heat available from the exhaust gas or the coolant fluid heat exchange systems.

Applicant believes that in general the higher the temperature maintained in the pressure storage vessel, the more effective and efficient will be the fuel supply system of this invention. Applicant believes, therefore, that the fuel vapor in the pressure storage vessel should be maintained at a temperature of at least about 160° F. The temperature may conveniently be maintained in a range of between about 170° F. and about 230° F., and conveniently at a temperature of about 200° F.

Applicant believes, however, that even better fuel utilization will be achieved if a substantially higher temperature, such as a temperature of even up to about 300° F. or more is maintained.

In practice it should be possible to maintain sufficient temperatures by utilizing the exhaust gases for primary heating, with electrical heating means or cooling fluid heat exchange means as a supplement or standby system.

Applicant believes that the upper temperature limit at which the temperature of the pressure storage vessel is maintained, will be governed by economic considerations and by the temperature at which fuel vapor reaches its flash point or tends to become unreasonably dangerous for conventional use.

The pressure storage vessel may be of any suitable material and may be of a convenient size to store an adequate quantity of fuel vapor at an appropriate pressure. Applicant believes that a pressure tank having a size of about 2 cubic feet or less, should be adequate for use in motor vehicles. Applicant further believes that a pressure storage vessel capable of withstanding a pressure of about 150 p.s.i.a. should be adequate for most purposes.

The compressor means may be any conventional compressor which could provide a sufficiently low pressure in its intake to extract an effective quantity of fuel vapor from a fuel tank, and which can deliver a sufficient pressure to provide a sufficiently pressurized source of fuel vapor in the pressure storage vessel.

In an embodiment of the invention, for example, the compressor means may comprise a compressor which can draw several inches of vacuum and which can, for example, provide a pressure of about 60 p.s.i.a. in the pressure storage vessel. Such a compressor may typically be a compressor which can deliver compressed fuel vapor at a rate of say 4 to 5 cubic feet per minute. Such a compressor would typically be operated by a motor driven from the internal combustion engine, having a rating of about $\frac{1}{8}$ to $\frac{1}{2}$ H.P.

The system of this invention preferably includes vaporizing means for vaporizing a liquid hydrocarbon fuel in a fuel tank during use.

The vaporizing means may be in the form of heating means for heating fuel in such a fuel tank. It may also comprise agitation means for agitating liquid fuel in such a fuel tank.

In one preferred embodiment of the invention the vaporizing means may comprise recycle means to recycle fuel from the pressure storage vessel into a liquid fuel when contained in a fuel tank during use.

The recycle means conveniently includes a discharge nozzle having a plurality of discharge openings for discharging recycled fuel into such a fuel tank and thereby cause both heating and vaporization of fuel in such a fuel tank.

The recycle means preferably has an intake positioned proximate a base portion of the pressure storage vessel for draining liquid fuel from the vessel to a fuel tank during use.

The system preferably includes a fuel tank for holding a liquid hydrocarbon fuel during use, with the discharge nozzle leading to a lower zone of the fuel tank to be submerged during use.

The fuel tank may include vacuum release means to release vacuum drawn therein by the compressor during use and thereby prevent collapsing of the fuel tank. Alternatively, however, the fuel tank may be divided into two compartments which are in communication with each other along a duct proximate the base of the tank to prevent air above one compartment from mixing with fuel vapor withdrawn from the other compartment during use.

The system may include additional heating means for heating the fuel tank. The heating means may comprise a heat exchanger system to be heated by means of cooling fluid for or by means of exhaust gases from an internal combustion engine during use.

The system may include first pressure responsive switch means to control the compressor means for limiting the pressure in the pressure storage vessel during use. It may also include second pressure responsive switch means to control the compressor means for limiting the lowest tolerable pressure in a fuel tank during use.

The system may further include heat control means for controlling a pressure reducing valve in the recycle means to reduce recycle flow as the temperature increases in the pressure storage vessel and the demand for fuel vapor thus decreases, and to increase flow through the recycle means as the temperature reduces in the pressure storage vessel during use. In the latter case the increased flow will cause additional vaporization of fuel in the fuel tank thereby insuring that an adequate supply is available for feeding into the pressure storage vessel.

The system may include a shut-off valve which is operatively connected to the compressor means to shut off flow out of the pressure storage vessel unless the compressor means is in operation.

The system further preferably includes a pressure reducing valve in the supply means for controlling the pressure at which fuel vapor is supplied to an internal combustion engine during use, and also includes a demand regulator to control flow during use.

The system may include a pressure responsive safety switch to switch off all flow through the supply means and out of the pressure storage vessel unless demanded by a user and/or by low pressure in the intake of an internal combustion engine to which the system is operatively connected during use. This is an additional safety feature to prevent the release of fuel vapor at high pressure in the event of an accident or the like.

The invention further extends to a system as described, including an internal combustion engine to which the system is operatively connected, the engine including a carburetor to be supplied with fuel vapor by the supply means.

The carburetor may be a carburetor of any conventional type which can effectively handle fuel vapor, form a fuel vapor/air mixture, and then supply the mixture to the intake manifold of the engine. Thus, for example, the carburetor may be an updraft carburetor of the type suitable for use in connection with gas powered internal combustion engines.

The system may include a liquid supply system leading from the fuel tank to a carburetor for handling liquid fuel, with a liquid fuel pump in the liquid supply system. The liquid supply system may be utilized for supplying liquid fuel to the engine when starting or when excessive demand is placed on the engine during use and there is insufficient heated fuel vapor for driving the engine.

The invention further extends to an internal combustion engine including a fuel supply system as described.

The invention further extends to a method of supplying a hydrocarbon fuel to an internal combustion engine, the method comprising:
(a) withdrawing hydrocarbon fuel vapor from a liquid hydrocarbon fuel source;
(b) feeding the vapor into a pressure storage vessel for storing the vapor under pressure;
(c) heating the fuel to maintain fuel in a vaporized state in the pressure storage vessel during use; and
(d) supplying fuel vapor from the pressure storage vessel to such an internal combustion engine.

While the fuel supply system and method of this invention may be used in conjunction with various types of engines, they will tend to find particular application in regard to internal combustion engines utilized in vehicles.

An embodiment of the invention is now described by way of example with reference to the accompanying drawing.

The drawing shows a diagrammatic, schematic view of a fuel supply system in accordance with this invention, operatively connected to an internal combustion engine for a vehicle.

With reference to the drawing, reference numeral 10 refers generally to a fuel supply system for supplying a hydrocarbon fuel in the form of gasoline to an internal combustion engine 12 for a vehicle.

The fuel supply system 10 comprises a pressure storage vessel 14 for storing hydrocarbon fuel vapors such as gasoline vapor under pressure, and a fuel tank 16 for storing a liquid hydrocarbon fuel such as gasoline 18.

The fuel tank 16 has a filling opening 20 and is divided into two compartments 16.1 and 16.2.

The compartments 16.1 and 16.2 are in communication with each other by means of a duct 22 which is positioned proximate the base of the tank 16. This arrangement tends to limit the tendency for air which may be in the second compartment 16.2 above the liquid level therein, from entering into the first compartment 16.1 during use. This provides the advantage that the tank 16 need not be made airtight and that the danger of the fuel tank collapsing is therefore avoided.

The fuel supply system 10 further comprises a compressor 24. The compressor has an intake duct 26 which leads from an upper region of the first compartment 16.1 to the compressor 24, and a discharge duct 28 which leads to the pressure storage vessel 14.

Applicant believes that the compressor 24 should be a compressor which could supply about 5 cubic feet per minute of gasoline vapor, and which can provide a pressure of about 60 p.s.i.a. in the pressure storage vessel 14 while providing a few inches of vacuum in the first compartment 16.1.

The fuel supply system 10 includes recycle means for recycling fuel from the pressure storage vessel 14 to the fuel tank 16. The recycle means preferably comprises a recycle duct 30. The recycle duct 30 has an intake 32 which is positioned near a base portion of the pressure storage vessel 14. By having the intake 32 so positioned, liquid fuel which forms in the pressure storage vessel 14 when the system is not in use or when the temperature in the pressure storage vessel 14 has dropped too low during use, will automatically be able to recycle from the pressure storage vessel 14 to the fuel tank 16.

The recycle duct 30 has a discharge nozzle 34 with a plurality of discharge apertures 36.

The discharge nozzle 34 is preferably positioned in the first compartment 16.1 so that fuel vapor and liquid fuel recycled from the vessel 14 and discharged from the discharge nozzle 34 will heat and agitate the liquid fuel 18 in the first compartment 16.1 thereby encouraging vaporization of liquid fuel in the first compartment 16.1.

The internal combustion engine 12 includes a double carburetor system. The double carburetor system comprises a vapor carburetor 38 for handling gasoline vapor, and a liquid carburetor 40 for handling liquid gasoline.

The vapor carburetor 38 and liquid carburetor 40 may be of any conventional type which can handle gasoline vapor and liquid gasoline respectively as required by an internal combustion engine. The vapor carburetor 38 may conveniently be a carburetor of the updraft type which is conventionally used with engines powered with gaseous fuels.

The internal combustion engine includes an exhaust duct 42 and a cooling system for cooling the engine 12 during use. The coolant system includes a heat exchanger 44 positioned in the internal combustion engine 12, a coolant discharge duct 46 and a coolant supply duct 48.

The fuel supply system 10 includes heating means for heating the pressure storage vessel 14 to maintain gasoline vapor therein at an elevated temperature during use.

The heating means preferably comprises electrical heating means 50 which is adapted to be electrically powered.

The heating means further comprises a heat exchanger 52 for conveying exhaust gases from the exhaust duct 42 through the pressure storage vessel 14 in heat exchange relationship with fuel vapor therein.

The heating means further comprises a heat exchanger 54 for conveying heated coolant fluid from the coolant discharge duct 46 in heat exchange relationship with fuel vapor in the pressure storage vessel 14. The discharge duct may include a by-pass conduit 55 for coolant to by-pass the vessel 14 when the temperature of the vessel 14 is such that the coolant should not be circulated through the vessel 14.

While applicant has found that the system can operate effectively even when fuel vapor in the pressure storage vessel 14 is maintained at a temperature as low as about 160° F., applicant believes that significantly better results are achieved as the temperature increases to about 200° F. and even up to say 280°–320° F.

By providing the electrical heating means 50, fuel in the pressure storage vessel which has cooled when the internal combustion engine 12 has not been in use, can be rapidly heated to become vaporized and to attain a sufficient temperature for use in the engine 12.

Once the engine 12 has been operated for a period and the heat released by the heat exchangers 52 and/or 54 is sufficient to maintain the vessel 14 at the desired temperature, the electrical heating means 50 may be switched off. It may be operated whenever additional heating is required.

The pressure storage vessel 14 has a supply duct 56 leading from an upper region thereof to the vapor carburetor 38 for supplying fuel vapor to the carburetor during use.

To conserve the energy supplied to the storage vessel 14, the vessel 14, and the supply duct 56, will preferably be effectively insulated.

Since heating of the liquid fuel 18 will also encourage vaporization thereof, the heat exchanger 54 may have a coolant fluid duct 58 leading to a heat exchanger 60 provided in the fuel tank 16. From the heat exchanger 60 the coolant fluid will be returned to the heat exchanger 44 in the engine 12 along coolant supply duct 48.

The pressure storage vessel 14 should preferably be made of a material which can withstand the designed operating pressure with a safety factor of at least about 2 to 3 times. It may be of any convenient size which can hold a sufficient quantity of fuel vapor to insure that vapor at high pressure is available when an additional supply of vapor is suddenly required during use of the engine 12.

The fuel supply system 10 includes a first pressure responsive switch 62 to control the compressor 24 for limiting the maximum pressure permitted in the pressure storage vessel 14 during use.

The system 10 further includes a second pressure responsive switch 64 to control the compressor 24 for limiting the amount of vacuum pulled in the fuel tank 16 during use to prevent collapsing thereof if the filling opening 20 becomes blocked.

The system 10 includes a pressure reducing valve 66 in the recycle duct 30. The pressure reducing valve 66 insures that pressure can be maintained in the vessel 14 while vapor and/or liquid is being recycled through the duct 30 to the fuel tank 16.

The system 10 includes heat control means 68 which is operatively connected to the pressure reducing valve 66. The heat control means 68 responds to temperature within the pressure storage vessel 14 to reduce recycle flow through the duct 30 as the temperature increases in the pressure storage vessel 14, and to increase flow through the recycle duct 30 as the temperature reduces in the pressure storage vessel 14 during use. In the latter case, as the temperature reduces in the pressure storage vessel 14, additional fuel vapor will be recycled to increase agitation of the fuel 18 in the tank 16 and thereby encourage additional vaporization.

The system 10 further includes a shut-off valve 70 which is operatively connected to the compressor 24 to shut-off all flow out of the pressure storage vessel 14 unless the compressor 24 is operating. This insures that pressure can be maintained within the vessel 14, and that no leakage will occur if the vehicle is involved in an accident and the compressor ceases to operate.

The supply duct includes a pressure reducing valve 72 to reduce the pressure of the fuel vapor and insure that fuel vapor is supplied to the carburetor 38 at a suitable pressure such as, typically, about 9 p.s.i.g.

The supply duct 56 further includes a demand regulator 73 which is operatively associated with the engine 12, and which is controllable to supply the appropriate quantity of fuel vapor to the engine 12 as may be required by the operator.

The system then further includes a pressure responsive safety switch 74 which is set so that it will shutoff unless the engine 12 demands fuel from the system 10. This will insure that as soon as there is no demand pressure from the engine 12, the switch 74 will shut to prevent any leakage from the pressure storage vessel 14 in the event of an accident or the like.

The system 10 further includes a liquid supply system 76 which incorporates a liquid fuel pump 78.

The liquid supply system 76 leads from the fuel tank 16 to the liquid carburetor 40. The fuel pump 78 can therefore be utilized to supply liquid gasoline to the engine 12 when required by operating conditions or when the engine is to be started-up without waiting for the electrical heating means 50 to heat the remaining fuel in the pressure storage vessel 40.

Applicant conducted certain experiments with a fuel supply system 10 generally of the type illustrated in the drawing.

In the experiments a standard six-cylinder Ford engine was used. The pressure storage vessel 14 was heated solely by means of a heat exchanger supplied with coolant fluid from the engine. Fuel in the fuel tank was also heated by means of the coolant fluid. The temperature which was maintained in the pressure storage vessel 40 was between about 160° F. and about 170° F.

A compressor of the type conventionally used in airconditioners, was utilized as the compressor 24. It was capable of drawing a vacuum of about 14 inches, and supplying fuel vapor at a pressure of up to about 60 p.s.i.a.

In the experiments which were conducted, the engine was operated at 1900 r.p.m. This rate of revolution was selected since the heating was done using coolant only and a sufficient temperature could not be produced to operate the engine consistently at a higher rate.

The engine was first run at 1900 r.p.m. with liquid fuel in accordance with a conventional liquid gasoline powered system. The engine was run for exactly 1½ hours whereupon it was switched off and the fuel consumed was determined.

Thereafter the engine was run for exactly 1½ hours at 1900 r.p.m. utilizing fuel vapor produced in accordance with this invention. After exactly 1½ hours, the engine was switched off and the fuel consumption was determined. It was found that utilizing vapor in accordance with this invention, required almost 60% less fuel than when the liquid gasoline was used.

It was further noted that the level of pollutants in the exhaust gases were significantly reduced when gasoline in vapor form was used as the combustible medium rather than liquid gasoline.

Applicant further found that as the temperature in the pressure storage vessel 14 was increased, it was possible to generate wave vapor in the fuel tank. It was further found that as the temperature of the vapor increased, it could be used more effectively in the engine thereby permitting operation of the engine at substantially higher revolutions.

Applicant believes that the embodiment of the invention as illustrated in the drawing provides several significant advantages.

By utilizing a pressure storage vessel 14 which can store fuel vapor at elevated temperature and at high pressure, a sufficient store of vapor is provided to meet the fuel supply demands of an engine 12 operating under differing load conditions. In other words, the pressure storage vessel 14 insures that the engine 12 can rapidly respond when the speed is to be increased or when an additional load is imposed.

By recycling fuel from the vessel 14 to the tank 16 additional vaporization is encouraged. This additional vaporization is caused not only by the fact that the recycled fuel is already heated in the pressure storage vessel 14, but also by the fact that the recycled fuel is at higher pressure and is discharged through a plurality of aperatures 36 to thereby further encourage vaporization and agitation of gasoline in the fuel tank 16.

The recycle of fuel from the pressure storage vessel 14 provides the further advantage that vaporized fuel which condenses in the vessel 14 can readily be recycled to the fuel tank 16.

The fuel supply system 10 provides a major advantage in that no significant quantity of air is mixed with the fuel vapor before the fuel vapor enters the carburetor 38 of the engine 12. The formation of an explosive mixture is therefore largely delayed until the mixture is introduced into the intake duct of the engine 12. This therefore significantly reduces the potential hazard presented by the fuel supply system 10 of this invention and tends to overcome or at least significantly reduce the problems presented by the prior art systems in which fuel/air mixtures were formed in the fuel tank or at a point remote from the engine 12.

In an embodiment of the invention the pressure storage vessel 14 may be positioned within the fuel tank 16. In this way heat released from the vessel 14 will serve the function of heating liquid fuel 18 within the fuel tank 16.

The fuel supply system of this invention provides the further advantage that standard components known to those skilled in this art, can be utilized for the various aspects of the system 10 thereby insuring that the system 10 can be produced at a realistic and competitive cost.

I claim:

1. A fuel supply system for the supply of a hydrocarbon fuel to an internal combustion engine, the sytem comprising:
   (a) a pressure storage vessel for storing a hydrocarbon fuel vapor under pressure;
   (b) compressor means for withdrawing hydrocarbon fuel vapor from a liquid hydrocarbon fuel tank and feeding the vapor under pressure to the pressure storage vessel;
   (c) heating means for maintaining the fuel vapor in a heated condition during use;
   (d) recycle means for recycling fuel vapor from the pressure storage vessel to the fuel tank for heating and agitating fuel in such a fuel tank;
   (e) supply means leading from the pressure storage vessel for the supply of fuel vapor to an internal combustion engine during use.

2. A system according to claim 1, in which the heating means comprises means for heating the pressure storage vessel during use to thereby heat fuel vapor therein.

3. A system according to claim 2, in which the heating means comprises electrical heating means to be electrically heated.

4. A system according to claim 2, in which the heating means comprises heat exchanger means adapted to be heated by means of exhaust gases from an exhaust system of an internal combustion engine during use.

5. A system according to claim 2, in which the heating means comprises heat exchanger means adapted to be heated by means of coolant fluid employed in an internal combustion engine coolant system for cooling such an engine.

6. A system according to claim 1, in which the recycle means includes a discharge nozzle having a plurality of discharge openings for discharging recycled fuel into such a fuel tank.

7. A system according to claim 6, in which the recycle means has an intake positioned proximate a base portion of the pressure storage vessel for draining liquid fuel from the vessel to a fuel tank during use.

8. A system according to claim 6, including a fuel tank for holding a liquid hydrocarbon fuel during use, with the discharge nozzle leading to a lower zone of the fuel tank so that it will be submerged during use.

9. A system according to claim 8, in which the fuel tank is divided into two compartments which are in communication with each other along a duct proximate the base of the tank to prevent air above one compartment from mixing with fuel vapor withdrawn from the other compartment.

10. A system according to claim 8, including heating mechanism for heating the fuel tank.

11. A system according to claim 10, in which the heating mechanism comprises a heat exchanger system to be heated by means of coolant fluid or by means of exhaust gases from an internal combustion engine during use.

12. A system according to claim 1, including first pressure responsive switch means to control the compressor means for limiting the pressure in the pressure storage vessel during use.

13. A system according to claim 12, including second pressure responsive switch means to control the compressor means for limiting the lowest tolerable pressure in a fuel tank during use.

14. A system according to claim 1, including a pressure reducing valve in the recycle means.

15. A system according to claim 14, including heat control means for controlling the pressure reducing valve to reduce flow as the temperature increases in the pressure storage vessel, and to increase flow through the recycle means as the temperature reduces in the pressure storage vessel during use.

16. A system according to claim 14, including a shut-off valve which is operatively connected to the compressor means to shut off flow out of the pressure storage vessel unless the compressor means is in operation.

17. A system according to claim 1, including a pressure reducing valve in the supply means for controlling the pressure at which fuel vapor is supplied to an internal combustion engine during use, and including a demand regulator to control flow during use.

18. A system according to claim 17, including a pressure responsive safety switch to switch off all flow through the supply means unless demanded by low pressure in the intake of an internal combustion engine during use.

19. A system according to claim 1, including an internal combustion engine operatively connected to the supply means, the engine including a carburetor to be supplied with fuel vapor by the supply means.

20. A system according claim 19, in which the carburetor is an updraft carburetor.

21. A system according to claim 19, including a fuel pump operably connected to the fuel tank and a liquid fuel carburetor operably connected to the fuel pump for the supply of liquid fuel to the engine when required.

22. A fuel supply system for the supply of a hydrocarbon fuel to an internal combustion engine, the system comprising:
   (a) a pressure storage vessel for storing a hydrocarbon fuel vapor under pressure;
   (b) a compressor for withdrawing hydrocarbon fuel vapor from above the surface of a body of liquid hydrocarbon fuel during use, and supplying the fuel vapor under pressure to the pressure storage vessel;
   (c) heating means for heating the pressure storage vessel during use;
   (d) recycle means for recycling fuel under pressure from the pressure storage vessel to such a body of liquid fuel during use for agitating and heating the body for promoting vaporization thereof; and
   (e) supply means for the supply of fuel vapor from the pressure storage vessel for use in fueling an internal combustion engine.

23. A method of supplying a hydrocarbon fuel to an internal combustion engine, the method comprising:
   (a) withdrawing hydrocarbon fuel vapor from a liquid hydrocarbon fuel source;
   (b) feeding the vapor into a pressure storage vessel for storing the vapor under pressure;
   (c) heating the fuel in the pressure storage vessel to maintain fuel in a vaporized state during use;
   (d) recycling fuel vapor from the pressure storage vessel to the liquid hydrocarbon fuel source including the substeps of,
      withdrawing an amount of fuel vapor under pressure from said pressure storage vessel,
      injecting said amount of fuel vapor into the liquid fuel source to agitate and heat the liquid fuel source; and
   (e) supplying fuel vapor from the pressure storage vessel to such an internal combustion engine.

24. A method according to claim 23, in which the fuel is heated by heating the pressure storage vessel by means of heating means including electrical heating means, including coolant fluid from such an internal combustion engine, or including exhaust gases from such an enginge during use.

25. A method according to claim 23, including the step of controlling the recycle rate of fuel inversely in relation to the temperature of fuel vapor in the pressure storage vessel.

26. A method according to claim 23, which includes the step of supplying liquid hydrocarbon fuel to such an internal combustion engine during start up or during high load periods as an alternative or as a supplement to the fuel vapor.

27. A system for supplying hydrocarbon fuel to an internal combustion engine, comprising:
   fuel tank means for storing a quantity of liquid hydrocarbon fuel;
   a pressure storage vessel for storing substantially vaporized hydrocarbon fuel;
   compressor means for withdrawing hydrocarbon fuel from the fuel tank means and for feeding hydrocarbon fuel under pressure in a substantially vaporized state to the pressure storage vessel; and
   recycle means for circulating a pressurized amount of fuel vapor from the pressure storage vessel to the fuel tank means for agitating and heating said liquid quantity of fuel.

28. The system as set forth in claim 27, wherein said recycle means is operably coupled to the pressure storage vessel in such a position for circulating fuel from the pressure storage vessel as a liquid and vapor mixture.

29. The system as set forth in claim 27, wherein said recycle means is operably coupled to the fuel tank means for injecting said amount directly into the liquid quantity.

30. The system as set forth in claim 27, said recycle means including a discharge nozzle having a plurality of discharge openings disposed for discharging said fuel vapor amount into said fuel quantity in a bubbling-type action for heating and promoting vaporization of said fuel quantity.

* * * * *